United States Patent [19]

Cezar et al.

[11] 4,323,915
[45] Apr. 6, 1982

[54] METHOD AND AN APPARATUS FOR VIDEO TAPE RECORDING

[75] Inventors: Robert M. Cezar; Alberto B. Paz, both of Sunnyvale, Calif.

[73] Assignee: Cezar International, Ltd., Sunnyvale, Calif.

[21] Appl. No.: 139,238

[22] Filed: Apr. 11, 1980

[51] Int. Cl.³ .................... H04N 5/76; H04N 9/42
[52] U.S. Cl. ................................. 358/4; 358/11
[58] Field of Search ............... 358/4, 8, 31, 21, 11–13

[56] References Cited

U.S. PATENT DOCUMENTS

| 3,626,087 | 12/1971 | Tomioka | 358/4 |
| 3,715,468 | 2/1973 | Fujita | 358/4 |
| 3,872,498 | 3/1975 | Pritchard | 358/21 |
| 4,200,881 | 4/1980 | Carnt et al. | 358/4 |
| 4,242,699 | 12/1980 | Kobayashi et al. | 358/4 |

Primary Examiner—Aristotelis M. Psitos

Attorney, Agent, or Firm—Thomas E. Schatzel

[57] ABSTRACT

A method and an apparatus for the recordation and reproduction of standard color-television signals, the apparatus including an encoder having circuitry for separating into separate signals the luminance and chrominance portions of a standard color-television signal, for heterodyning the chrominance signal from its normal frequency to a new, lower, odd multiple of the half-horizontal frequency, and for combining the luminance and heterodyne chrominance signals to develop an encoded-color signal, a conventional video recorder for recording and reproducing the encoded-color signal, and a decoder having circuitry for separating the reproduced encoded-color signal into separate reproduced luminance and reproduced chrominance signals, for heterodyning the reproduced chrominance signal back to its normal frequency and for combining the reproduced luminance and normalized chrominance signals to develop a reproduced color-television signal.

7 Claims, 7 Drawing Figures

Fig_1

Fig_2

Fig_3

Fig. 4

Fig_5

Fig.6

Fig_7

METHOD AND AN APPARATUS FOR VIDEO TAPE RECORDING

BACKGROUND OF THE INVENTION

1. Field of the Invention

The present invention relates generally to video tape recorders and more particularly to a recording apparatus in which the chrominance portion of a standard color-television signal is encoded for recording as part of the luminance portion of the standard color television signal.

2. Description of the Prior Art

The present United States color television standard is the result of efforts by the National Television System Committee, NTSC, during the infancy of the television to develop a standard color-television system compatible with the then existing black and white system. In the black and white system a signal is developed, as by a black and white television camera converting the luminosity of successive points along successive horizontal scan lines of an image into corresponding signal levels. Blanking and synchronizing information, including horizontal-synchronization pulses, are combined with the image signal to develop a monochrome, or black and white, television signal. The monochrome signal may then be transmitted as an amplitude modulation (vestigal sideband) of a visual-carrier signal located 1.25 megahertz above the lower boundary of a 6 megahertz television channel. Aural information, in the form of an audio signal, is transmitted with the monochrome signal as frequency modulation of an aural-carrier signal located 4.5 megahertz above the visual carrier.

In the NTSC standard color television system, three signals designated R, B and G, which represent the red, blue and green portions, respectively, of an image, are developed, as by a color-television camera. By combining the R, B and G signals so as to develop a signal which is 30% R signal, 11% B signal and 59% G signal and combining therewith blanking and synchronizing information, a luminance, or Y, signal is developed that closely resembles the monochrome signal developed by the black and white television camera. The luminance signal, which represents the luminance or brightness portion and much of a detail of an image, is used to replace the monochrome signal of the black and white system.

So that a color-television receiver will be able to reconstruct the R, B and G signals, a chrominance signal is also developed and combined with the luminance signal. The chrominance signal may be developed by normalizing the levels of the R, B and G signals and combining specific portions thereof so as to develop two signals: an I signal which includes 60% of the R signal, 32% of the inverted B signal and 28% of the inverted G signal and a Q signal which includes 21% of the R signal, 31% of the B signal and 52% of the inverted G signal. After the I signal is filtered by a 1.5 megahertz low-pass filter and the Q signal is filtered by a 0.5 megahertz low-pass filter, the I and Q signals are used to quadrature modulate a chrominance-carrier signal to develop the chrominance signal.

More specifically, from a 3.579545 megahertz reference signal, a Q carrier signal is developed which lags the reference signal by 147° and an I carrier signal is developed which lags the Q carrier signal by 90°. Following filtering, the I signal is used to modulate the I carrier signal, as in a balanced modulator, to develop a double-sideband suppressed-carrier signal and the Q carrier signal is similarly modulated by the Q signal. Next, the two modulated signals are combined to develop the chrominance signal. Finally, the chrominance signal is combined with the luminance signal for transmission therewith. Also combined with the luminance signal is a burst of the (roughly) 3.58 megahertz reference signal following each of the horizontal-synchronizing pulses of the luminance signal.

Because of the proportions of the R, B and G signals comprising the I and Q signals, a chrominance signal is developed having specific characteristics. The I and Q signals are such that complementary colors (colors which if added produced neutral result) are equal in amplitude and opposite in phase. For this reason, when the R, B and G signals are equal, the I and Q signals and the chrominance signal disappear. Further, characteristics of the chrominance signal are such that the instantaneous phase of the chrominance signal with respect to the reference signal, and the reference signal bursts, directly represents the hue of the respective portion of the image and the instantaneous amplitude of the chrominance signal indirectly represents the saturation of the color.

The chrominance signal also represents the sum of an R-Y signal modulating a carrier signal which lags the (roughly) 3.58 megahertz reference signal by 90° and a B-Y signal modulating a carrier signal which lags the R-Y carrier signal by 90°.

It is important to note that the chrominance-carrier frequency, as specified by the NTSC, is 455 times the half-horizontal frequency. Additionally, because of the band width of the R-Y and B-Y signals and the modulation process, the chrominance signal contains sideband energy which extends below the chrominance-carrier frequency (roughly) 1.5 megahertz to (roughly) 2.1 megahertz and above the chrominance-carrier frequency (roughly) 0.5 megahertz to (roughly) 4.1 megahertz.

The NTSC standard color-television system and similar systems, such as the Phase-Alternation-Line, PAL, system, are particularly suited to developing, for transmission, black and white compatible color-television signals. Not only is the chrominance-carrier frequency sufficiently removed from the aural carrier so as to minimize beat patterns, but the chrominance-carrier frequency is sufficiently high so as to permit inexpensive color television receivers to easily separate the luminance and chrominance portions of the standard color-television signal, as by the use of a low-pass and a high-pass filter, respectively. Since the chrominance-carrier frequency is above the normal band width of inexpensive black and white television receivers, the chrominance portion of the broadcast signal causes minimal disruption thereto. Because the chrominance-carrier frequency is an odd multiple of the half-horizontal frequency, the chrominance portion of the signal, as displayed on the picture tube of a television receiver, alternates in phase on a line-to-line basis causing any residual portion thereof to cancel. Also, the TV masks employed in color television receivers filter any remaining chrominance portion of the signal.

Since the chrominance carrier frequency is an odd multiple of the half-horizontal frequency, the spectrum of the chrominance portion of the standard color-television signal tends to fall within holes of the spectrum produced by the luminance portion thereof. This relationship is important in that the luminance and chrominance portions of the signal may be readily separated using comb-type filters.

The NTSC standard color television system, and similar systems, are not particularly suited to developing color-television signals for recordation upon magnetic tape. As a result, a number of different systems have been developed for color television recording. One such system is exemplified by recorders of the type which are designated VR2000 by the Ampex Corporation. Each of these recorders employs a carrier-signal-generating oscillator that is frequency modulated responsive to the amplitude of the combined luminance and chrominance portions of the standard color-television signal, to develop a modulated signal suitable for recordation upon a length of magnetic recording tape. The modulated signal is used to drive four magnetic recording heads mounted in quadrature on the periphery of a two inch diameter rotating drum. The magnetic tape is drawn across the drum along a path parallel to the axis thereof such that the heads record the modulated signal upon a series of tracks which traverse the tape at an oblique angle with respect to the axis thereof.

When the carrier signal is modulated by the combined luminance and chrominance portions of the standard color-television signal, sideband energy is produced which extends above and below the carrier frequency in proportion to the band width of the combined signal. In order to prevent appreciable energy from extending below the carrier frequency into the upper spectrum of the combined signal to be folded back developing Moire type distortion, a relatively high carrier frequency is employed. The free-running carrier frequency and the depth of carrier modulation employed by the above-mentioned recorders are such that the frequency of the modulated signal is 7.06 megahertz responsive to sync-tip levels of the combined signal, 7.9 megahertz responsive to blanking levels of the signal and 10 megahertz responsive to reference white levels of the signal.

Unfortunately, the relatively high carrier frequency employed by the above-mentioned recorders requires the use of a relatively high tape speed and relatively complex circuitry to faithfully record and reproduce the modulated signal and thus the combined luminance and chrominance portions of the standard color-television signal. For applications in which the full band width of the luminance portion of the standard color-television signal need not be preserved, a system called color-under has been developed. Recorders employing the color-under system each develop a signal suitable to recordation upon a length of magnetic recording tape by frequency modulating a relatively lower frequency carrier-signal generating oscillator responsive to a signal derived by low-pass filtering the color signal (or a monochrome black and white signal).

By reducing the band width of the signal used to modulate the carrier, the spectrum of the modulated signal is also reduced permitting the use of a lower carrier frequency and lower tape speed without incurring Moire interference. Unfortunately, the reduced modulation band width is insufficient to process the normal chrominance portion of the standard color-television signal. For this reason, recorders employing the color-under system process separately the chrominance portion of the signal. First, color-under type recorders filter the color signal to recover the chrominance signal. Next, the chrominance signal is mixed with a higher-frequency local-oscillator signal to heterodyne the chrominance signal to a lower frequency. Finally, when the recorder ascertains that a color signal is being processed, as evidenced by the presence of reference-signal bursts, the lowered-frequency chrominance signal is combined, at a reduced level (reduced typically 6 db) with the frequency-modulated signal for recordation upon the tape.

A type of video recorder employing the color-under system is one which is designated U-matic by the Sony Corporation. U-matic recorders employ a carrier oscillator the free-running frequency and depth of modulation of which are such that a signal of 3.9 megahertz is developed responsive to sync-tip levels of the luminance portion of the standard color-television signal and a 5.4 megahertz signal is developed responsive to reference white levels thereof. Additionally, U-matic recorders heterodyne down for separate processing the chrominance portion of the signal to a carrier frequency of 688 kilohertz.

The modulated signal is used to drive a cylindrically-shaped scanner around which a length of ¾ inch wide magnetic recording tape is wound in helical fashion. The scanner is comprised of a pair of coaxially-disposed drum-shaped portions including a rigidly mounted lower portion which guides the tape and an upper rotating portion which carries a pair of diagonally-opposed heads. The tape is drawn around the scanner such that the heads record the combined signal upon a series of tracks which traverse the tape at an acute angle with respect to the axis thereof. To prevent cross-talk, the tracks are separated by a series of guard bands.

The signal band width used to frequency modulate the carrier is further restricted by color-under recorders of the type known as Beta and VHS. VHS type recorders develop a modulated signal of 3.4 megahertz responsive to sync-tip levels of the filtered standard color television signal and 4.4 megahertz responsive to reference white portions thereof. These recorders heterodyne down the chrominance signal to a 629 kilohertz carrier frequency after filtering the chrominance signal to a band width of approximately 1 megahertz. To further conserve recording tape, VHS and Beta type video recorders do not use guard bands to reduce cross-talk. Rather, these recorders employ scanners in which the heads are suitably cocked.

There are a number of disadvantages associated with the separate processing of the chrominance portion of standard color-television signals as implemented in video recordings employing the color-under system. The signal-to-noise ratio of the chrominance portion of the signal is degraded, typically 12 db. A 6 db penalty is incurred because the chrominance portion of the signal is recorded as a double-sideband suppressed-carrier signal rather than as a frequency-modulated signal. Further, the chrominance portion of the signal is recorded at a level typically 6 db lower level than the level of the luminance-modulated signal.

By employing two different carriers at widely separated wave lengths for carrying the luminance and chrominance information, time-base instabilities are introduced by the recording process which are not coherent. Any errors are further multiplied when the reproduced chrominance signal is heterodyned back to the original chrominance-carrier frequency. As such, the chrominance-carrier frequency is no longer an odd multiple of the half-horizontal frequency. Therefore, it is no longer possible to separate the chrominance and luminance portions of the color signal using comb-type filters. Additionally, the chrominance signal no longer cancels on a line-to-line basis on a television display. Further, direct time-based correction (where a time-base corrector is locked to the reference-signal bursts) is also no longer possible. In addition, because the chrominance signal is heterodyned down to a relatively low carrier frequency, the band width of the chrominance information is restricted.

Although the use of cocked heads in VHS and beta type recorders is effective in reducing cross-talk between tracks for the modulated-luminance signal, the use of cocked heads is much less effective in reducing cross-talk at the wave lengths employed for the heterodyned-chrominance signal.

SUMMARY OF THE PRESENT INVENTION

It is therefore an object of the present invention to provide an economical means of recording and reproducing standard color-television signals that preserves the chrominance-carrier frequency to half-horizontal frequency relationship.

Another object of the present invention is to provide a low-noise means for recording and reproducing standard color-television signals that is economical.

Briefly, the preferred embodiment of the present invention includes means for encoding a standard color-television signal, a conventional video tape recorder for recording and reproducing the encoded-color signal and means for decoding the reproduced encoded-color signal to develop a standard reproduced color-television signal. The preferred encoding means includes a synchronizing generator and a color encoder for directly encoding R, B and G signals. Unlike conventional generators, the synchronizing generator develops a reference signal at a reduced odd multiple of the half-horizontal frequency, a frequency which when used as the chrominance-carrier frequency causes the chrominance spectrum to be generally centered within the luminance band-width of the recorder. The matrix develops the encoded signal by using the frequency of the reference signal as the chrominance-carrier frequency when developing a combined luminance and reduced frequency chrominance signal from the R, B and G signals.

The preferred means for encoding a standard color-television signal includes a pair of comb filters for developing separate luminance and chrominance signals from a standard color-television signal, an oscillator phase locked to the standard color-television signal to develop a local-oscillator signal at an even multiple of the half-horizontal frequency, a mixer for heterodyning the chrominance signal with the local-oscillator signal to develop a similarly reduced-frequency chrominance signal and an adder for combining the luminance signal and the reduced-frequency chrominance signal to develop the encoded-color signal.

Preferably, the decoding means includes a pair of comb filters for separating the luminance and chrominance portions of the reproduced encoded-color signal into two separate signals, an oscillator phase locked to the reproduced encoded-color signal to develop a local-oscillator signal at an even multiple of the half-horizontal frequency, a mixer driven by the local-oscillator signal for heterodyning the reproduced chrominance signal to the standard chrominance frequency and an adder for combining the reproduced luminance signal and the heterodyned-chrominance signal to develop the standard reproduced color-television signal.

The present invention is advantageous in that it permits standard color-television signals to be recorded and reproduced as black and white signals using economical recorders thereby reducing the noise and stability degradation which usually results when such recorders are employed.

These and other objects and advantages of the present invention will no doubt become obvious to those skilled in the art after having read the following detailed description of the preferred embodiment illustrated in the several figures of the drawing.

DETAILED DESCRIPTION OF THE PREFERRED EMBODIMENT

Figure 1:
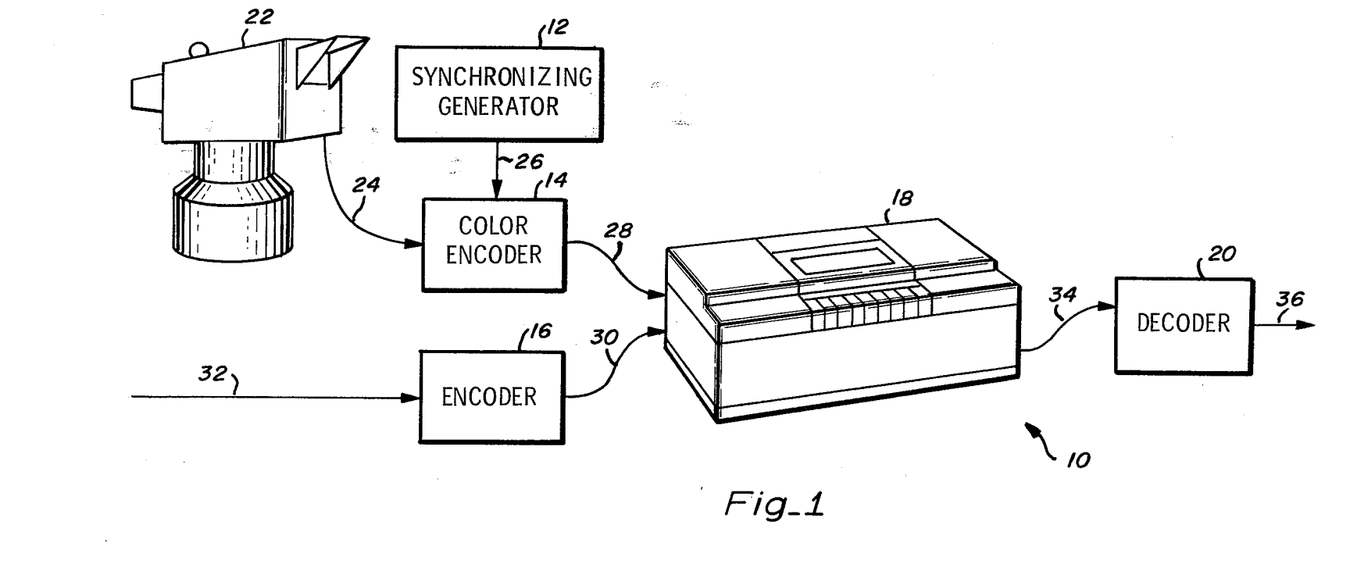
FIG. 1 is a combined perspective and block diagram illustrating the principal components of a video tape recording apparatus in accordance with the present invention.

Illustrated in FIG. 1 in combined perspective and block diagram form are the principal components of a video tape recording apparatus in accordance with the present invention. The video tape recording apparatus, which is generally designated by the number 10, includes means, such as a synchronizing generator 12 and a color encoder 14 or an encoder 16, for developing an encoded-color signal, a conventional video tape recorder 18 and means, such as a decoder 20, for developing a standard color-television signal from a reproduced encoder-color signal.

The encoder-color signal employed in the present invention differs from standard color-television signals, such as those employed in the NTSC and PAL systems, principally with respect to the chrominance-carrier frequency, and, of course, the reference-burst frequency. In the present invention, the frequency of the reference signal, from which the chrominance-carrier and burst signals are derived, is still an odd multiple of the half-horizontal frequency. However, in the present invention, a reduced multiple is chosen so as to generally center the spectrum of the chrominance portion of the encoded signal within the luminance, or monochrome, band width of recorder 18.

When standard R, B and G signals are available, such as those which are generated by a conventional television camera 22 on a cable 24, the preferred method of developing the encoded-color signal is by means of a synchronizing generator and a color encoder such as generator 12 and color encoder 14. Generator 12 includes a crystal-controlled reference oscillator, counters and associated circuitry for developing a color reference signal at the reduced multiple frequency, a synchronizing signal and a burst-gate signal all on a cable 26.

As compared to conventional synchronizing generators, generator 12 differs principally with respect to the reference-oscillator operating frequency, which is a reduced odd multiple of the half-horizontal frequency, and the division ratio of the counters driven by the oscillator, which compensate for the reduced oscillator frequency. In the preferred embodiment, an oscillator frequency of 193 times the half-horizontal frequency, a frequency of 1.521836 megahertz, and a counter divide ratio of 193 are employed, as opposed to the conventional 455 times half-horizontal frequency (roughly 3.58 megahertz) oscillator frequency and 455 divide ratio.

Color encoder 14 includes circuitry for developing the encoder-color signal on a cable 28 responsive to conventional R, B and G signals generated by color-television camera 22 on cable 24 and the reference, synchronizing and burst-gate signals developed by snychronizing generator 12 on cable 26. The principal difference between matrix 14 and those of conventional design is that matrix 14 employs circuitry, such as delay circuits, balanced mixers and a burst keyer, optimized for operation at the reduced reference signal frequency employed by synchronizing generator 12.

Encoder 16 develops an encoded-color signal on a cable 30 from a standard color-television signal developed on a cable 32. More specifically, encoder 16 separates into separate signals the luminance and the chrominance portions of the standard color-television signal developed on cable 32. The chrominance signal is heterodyned so as to have a carrier frequency of the reduced odd-multiple of half-horizontal frequency, (roughly) 1.52 megahertz in the preferred embodiment, by means of an oscillator locked to the horizontal-synchronizing portion of the standard color-television signal developed on cable 32. Finally, the heterodyned chrominance signal is combined with the luminance signal to develop the color-encoded signal on cable 30.

Video tape recorder 18 is of conventional design. Although recorder 18 is preferably of the type which uses the color-under system, such as those of the U-matic, VHS and beta types, any recorder suitable for recording upon a length of magnetic recording tape the encoded-color signal developed on cable 28 or cable 30 and for reproducing the recorded signal to develop a reproduced encoded-color signal on cable 34, may be employed.

Decoder 20 develops a standard color-television signal on a cable 36 responsive to the reproduced encoded-color signal developed on cable 34. First, separate reproduced luminance and reproduced chrominance signals are developed from the reproduced encoded-color signal developed on cable 34. Next, an oscillator locked to the horizontal-synchronizing portion of the reproduced encoded-color signal developed on cable 34 is used to heterodyne the reproduced chrominance signal to the standard frequency. Finally, the heterodyned chrominance signal and the reproduced luminance signal are combined by decoder 20 to develop the reproduced standard color-television signal on cable 36.

It is important to note that the spectrum of the chrominance portion of the encoded-color signal, as developed on cable 28 by synchronizing generator 12 and matrix 14 and the one developed on cable 30 by encoder 16, lies within the luminance, or monochrome, band width of recorder 18. Further, since the encoded-color signal lacks color-reference bursts of the type which are recognized by recorder 18, the recorder records the chrominance portion of the encoded-color signal as if it were a part of the luminance portion of the encoded-color signal. Thus, the chrominance portion of the encoded-color signal does not undergo the noise and relative time-base degradation normally encountered by the chrominance portion of standard color-television signals when they are recorded on a recorder of the type which processes separately the luminance and chrominance portions of standard color-television signals.

Although the present invention is particularly suited to the recordation and reproduction of satandard NTSC color television signals, and signals compatible therewith, such as PAL signals, the present invention may be advantageously employed to record and reproduce any color television signal the components of which are normally processed separately.

Figure 2:
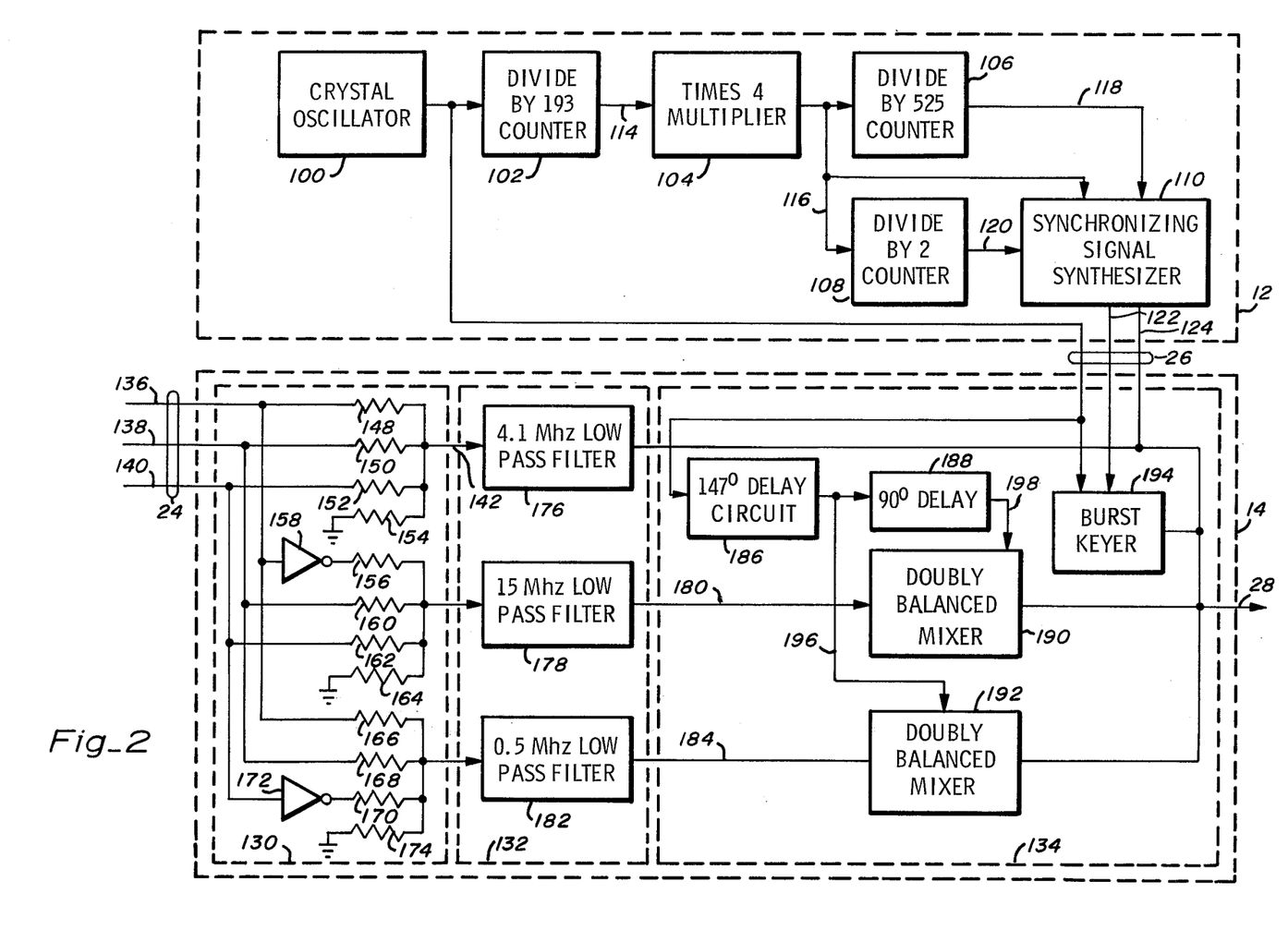
FIG. 2 is a combined block and schematic diagram further illustrating the synchronizing generator and the color encoder shown in FIG. 1.

Synchronizing generator 12 and color encoder 14 are further illustrated in FIG. 2. Generator 12 is shown to include a crystal-controlled oscillator 100, a divide-by-193 counter 102, a times-4-multiplier 104, a divide-by-525 counter 106, a divide-by-2 counter 108 and a synchronizing-signal synthesizer 110. Oscillator 100 includes circuitry for developing on a line 112 of cable 26 a reference signal having a frequency of 193 times the half-horizontal frequency, in other words a reference signal having a frequency of (roughly) 1.52 megahertz. Divide-by-193 counter 102 includes counters and other logic to develop on a line 114 a signal having a frequency of the half-horizontal frequency. It is important to note that crystal oscillator 100 and divide-by-193 counter 102 differ from comparable circuits of conventional synchronizing generators in that the latter normally employ a crystal oscillator for developing a reference signal at 445 times the half-horizontal frequency, (roughly) 3.58 megahertz, and a divide-by-455 counter to develop the half-horizontal frequency signal.

Times-4-multiplier 104, divide-by-525 counter 106, divide-by-2 counter 108 and synchronizing-signal synthesizer 110 are similar to comparable circuits of conventional synchronizing generators. From the half-horizontal frequency signal developed on line 114, multiplier 104 develops on a line 116 a twice-horizontal-frequency signal used for generating equalizing pulses. This signal is also employed by divide-by-525 counter 106 and divide-by-2 counter 108. Counter 106 develops on a line 118 a (roughly) 60 hertz signal used for vertical deflection. Divide-by-2 counter 108 employs the twice-horizontal-frequency signal developed on line 116 to develop on a line 120 a (roughly) 15.75 kilohertz signal used for horizontal deflection. From the signals developed on lines 116, 118 and 120, synchronizing-signal snythesizer 110 develops a conventional burst-gating signal on a line 122, of cable 26, and a conventional synchronizing signal on a line 124, also of cable 26.

Color encoder 14 includes a matrix 130, a filter network 132 and a quadrature modulator 134. As illustrated, matrix 130 includes three resistive summing networks which, with a pair of phase inverters, combine the (gamma corrected and level normalized) R, B and G signals that are developed on a line 136, a line 138 and a line 140, respectively, of cable 24, to develop Y, I and Q signals on a line 142, a line 144 and a line 146, respectively. A resistor 148 connected between line 136 and line 142, a resistor 150 connected between line 138 and line 142, and a resistor 152 connected between line 140 and line 142, with a resistor 154 connected between line 142 and circuit ground, from one such network. This network couples 30% of the R signal, 11% of the B signal and 59% of the G signal to develop thereon the luminance, or Y, signal.

Sixty percent of the inverted-R signal, 32% of the B signal and 28% of the G signal are combined by another one of the networks to develop an inverted-I signal. This network includes a resistor 156 coupled between lines 136 and 144 by a phase inverter 158, a resistor 160 connected between lines 138 and 144, a resistor 162 connected between lines 140 and 144, and a resistor 164 connected between line 144 and circuit ground.

The third network includes a resistor 166 connected between lines 136 and 146, a resistor 168 connected between lines 138 and 146, a resistor 170 coupled by a phase inverter 172 between lines 140 and 146 and a resistor 174 connected between line 146 and circuit ground. This latter network combines 21% of the R signal, 31% of the B signal and 52% of the inverted-G signal to develop the Q signal on line 146.

Filter network 132, which is also of conventional design, includes a 4.1 megahertz low-pass filter 176 coupling the Y signal from line 142 to cable 28, a 1.5 megahertz low-pass filter 178 coupling the I signal from line 144 to a line 180 and a 0.5 megahertz low-pass filter 182 coupling the Q signal from line 146 to a line 184.

Quadrature modulator 134 includes a 147°-delay circuit 186, a 90°-delay circuit 188, a pair of doubly-balanced mixers designated 190 and 192 and a burst keyer 194. Delay circuit 186 couples the (roughly) 1.52 megahertz reference signal developed on line 112 to a line 196 phase delayed 147° to develop thereon a Q-carrier signal. Delay circuit 188 couples the Q-carrier signal developed on line 196 to a line 198 phase delayed 90° to develop an I-carrier signal on line 198.

Doubly-balanced mixer 190 amplitude modulates the I-carrier signal developed on line 198 with the I signal developed on line 180 so as to develop a double-sideband suppressed-carrier signal that carries the I information, the signal being combined with the Y signal on cable 28. Modulating the Q-carrier signal developed on line 196 by the Q signal developed on line 184, doubly-balanced mixer 192 develops a double-sideband suppressed-carrier signal that carries the Q information, the signal also being combined with the Y signal on cable 28.

Responsive to the burst-gating signal developed on line 122, burst keyer 194 couples the (roughly) 1.52 megahertz reference signal developed on line 112 to cable 28 to be combined with the Y signal and the modulated signals. Also combined with the Y signal and the modulated signals on cable 28 is the synchronizing signal developed on line 124.

The principal difference between quadrature modulator 134 and those of conventional design is that the elements of modulator 134 are optimized for operation at the (roughly) 1.52 megahertz reference frequency rather than at the normal (roughly) 3.58 megahertz frequency.

For clarity in understanding the present invention, a specific implementation of color encoder 14 was chosen for illustration herein. As there are a number of equivalent means well known in the art for developing the standard chrominance signal from R, B and G signals, there are also comparable equivalent means for developing the chrominance portion of the encoded-color signal used in the present invention. For example, an equivalent encoded-color signal is developed on cable 28 when the I signal is inverted (or each of the components comprising the I signal are inverted), a 57°-delay circuit is employed to develop the I-carrier from the reference signal and a 90°-delay circuit is employed to develop the Q-carrier from the I-carrier signal. Additionally, an R-Y signal modulating an R-Y carrier which lags the reference signal 90° and a B-Y signal modulating a B-Y carrier signal which lags the R-Y carrier signal 90° may also be employed.

Thus, the method of developing the encoded-color signal from R, B and G signals includes the steps of generating a reference signal at an odd harmonic of the half-horizontal frequency, in this case 2.1 megahertz, dividing the reference signal, by 193, to develop a half-horizontal-frequency signal and developing therefrom a synchronizing signal. Also included are the steps of combining the R, B and G signals to develop a Y signal, combining the R, B and G signals to develop a first and a second combined signal, the I and Q signals, and delaying the phase of the reference signal to develop a first and a second carrier signal, the I and Q-carrier signals.

Finally, the steps of modulating the first carrier signal by the first combined signal to develop a first double-sideband suppressed-carrier signal, modulating the second carrier signal by the second combined signal to develop a second double-sideband suppressed-carrier signal and combining the synchronizing signal, the Y signal and the two double-sideband signals to develop the encoded-color signal are also performed.

Figure 3:
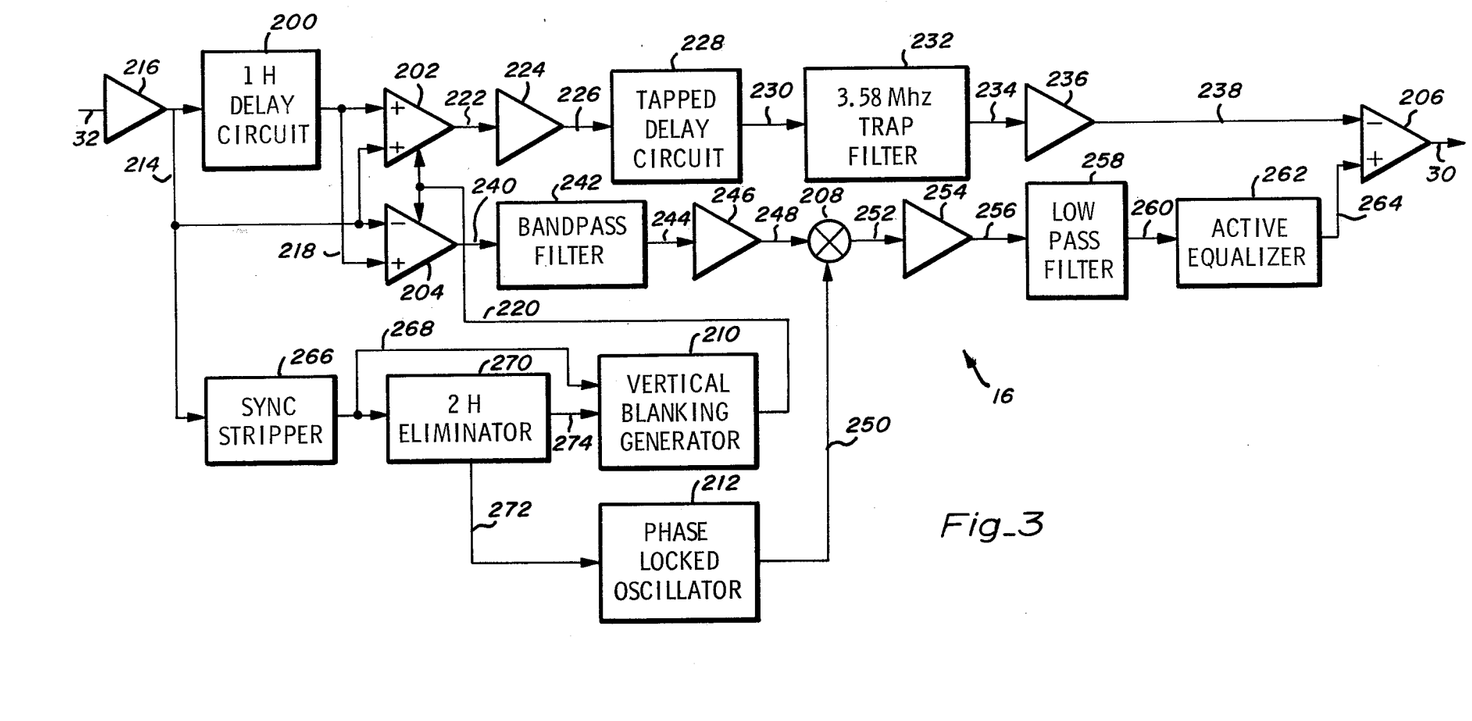
FIG. 3 is a block diagram further illustrating the encoder shown in FIG. 1.

A block diagram further illustrating encoder 16 is shown in FIG. 3. The principal components of encoder 16 include a one-horizontal-period-delay circuit 200, three signal adders designated 202, 204 and 206, a balanced mixer 208, a vertical-blanking-gating-signal generator 210 and a phase-locked oscillator 212. Delay circuit 200 has an input connected to a line 214 for receiving the standard color-television signal which is developed on cable 32 and coupled to line 214 by a buffer amplifier 216. A delay device in circuit 200 delays the signal developed on line 214 one horizontal period before coupling the signal to a line 218.

Adder 202 has a pair of non-inverting inputs, one being connected to line 218 and the other to line 214, a control input connected to a line 220 and an output connected to line 222. Adder 202, with delay circuit 200, operates as a comb filter combining in phase the standard color-television signal developed on line 214 with the one which is developed on line 218 delayed one horizontal period to remove from the signal the chrominance portion thereof. Absent the chrominance portion, the signal is coupled to line 222, except during the vertical-retrace period when the adder is disabled by a gating signal developed on line 220.

The filtered signal is coupled by a buffer amplifier 224 to a line 226 where it drives the input of a tapped-delay circuit 228. Circuit 228 includes a delay device having a number of outputs a selected one of which is coupled to a line 230. Circuit 228 provides a means for equalizing the chrominance and luminance delays introduced by the encoder. A 3.58 megahertz trap filter 232, connected between line 230 and a line 234, provides further rejection to residual chrominance portions of the signal before it is coupled by a buffer amplifier 236 to a line 238 to drive an inverting input of adder 206.

Adder 204 is illustrated as having an inverting input connected to line 214, a non-inverting input connected line 218, a control input connected to line 220 and an output connected to a line 240. Like adder 202, adder 204 operates, with delay circuit 200, as a comb filter. In this case, however, adder 204 substracts the standard color-television signal developed on line 214 from the one which is developed on line 218 delayed one horizontal period to develop a signal on line 224 which contains only the chrominance portion thereof. As with adder 202, adder 204 is gated off during the vertical-retrace period by the gating signal developed on line 220. Note, for clarity, a functional representation of adder 204 is illustrated in FIG. 3. Preferably, adder 204 shaves a number of components with adder 202.

Any residual luminance, synchronizing and blanking information is further filtered by a 3.58 megahertz bandpass filter 242 which couples the chrominance signal from line 240 to a line 244 where it is coupled by a buffer amplifier 246 to a line 248 to drive an input of mixer 208.

In addition to the input connected to line 248, mixer 208 has an input connected to a line 250 for receiving a local-oscillator signal developed thereon and an output connected to a line 252. Mixer 208 heterodynes the chrominance signal down in frequency so as to have a carrier frequency of 193 times the half-horizontal frequency (roughly) 1.52 megahertz.

After the heterodyned chrominance signal is coupled by a buffer amplifier 254 to a line 256, the heterodyned chrominance signal is further conditioned by a 2.5 megahertz low-pass filter 258, connected between line 256 and a line 260, and an active equalizer 262 connected between line 260 and a line 264 before driving a non-inverting input of adder 206.

The chrominance signal, now heterodyned down in frequency, is combined in adder 206 with the signal which represents the luminance, synchronizing and blanking information so as to develop the encoded-color signal on cable 30.

A synchronizing-signal stripper 266, connected between line 214 and a line 268, includes a single-stage common-emitter transistor amplifier having suitable band-width-limiting Miller and output capacitors. Stripper 266 filters the standard color-television signal developed on line 214 to develop a signal on line 268 which contains principally the synchronizing information thereof.

A vertical-synchronizing signal eliminator 270, 2H eliminator, includes a one-shot multivibrator driven by the synchronizing signal developed on line 268. Responsive to each of the horizontal-synchronizing pulses, the multivibrator develops a pulse width greater than one half of the horizontal period. Because of the triggering characteristics of the multivibrator, eliminator 270 develops pulses representing only the horizontal-synchronzing pulses on line 272 and a line 274.

Phase-locked oscillator 212 includes a voltage-controlled oscillator locked to the signal developed on line 272 for generating on line 250 the local-oscillator signal at 648 times the half-horizontal frequency. The local-oscillator signal generated on line 250 is divided down by a factor of 324 by counters and gates, also included in oscillator 212. An integrator, triggered by the divided signal, develops a ramp during a short period of each period of the divided signal. From each of the pulses developed on line 272, a differentiator develops a narrow pulse. Each of the narrow pulses is used to trigger a sample-and-hold circuit that samples the level of the ramp signal to develop a voltage-controlled-oscillator controlling signal.

Figure 4:
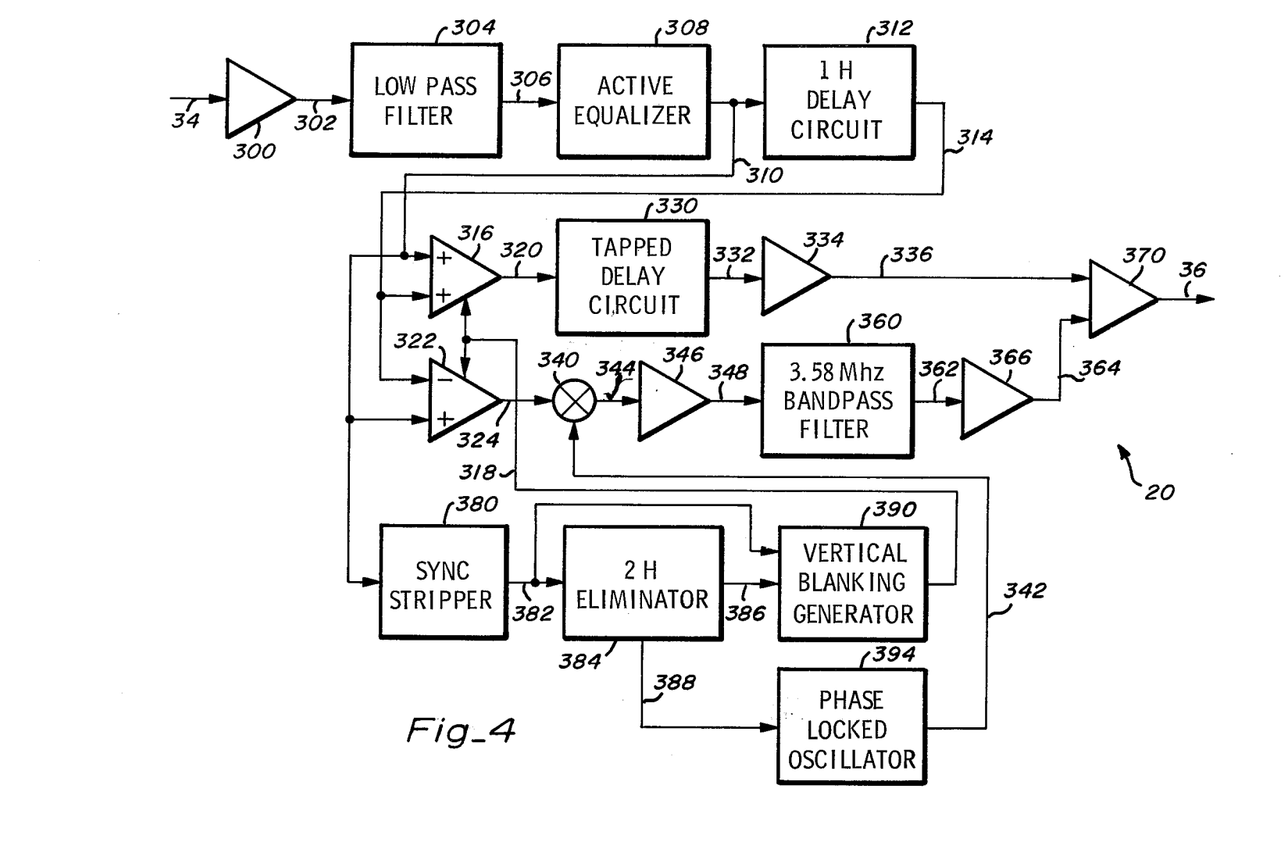
FIG. 4 is a block diagram further illustrating the decoder shown in FIG. 1.

Decoder 20 is further illustrated in block diagram form in FIG. 4. The reproduced encoded-color signal developed on cable 34 is coupled by a buffer amplifier 300 to a line 302. A low-pass filter 304 connected between line 302 and a line 306, an active equalizer 308 connected between line 306 and a line 310, and a one horizontal-period delay circuit 312 connected between line 310 and a line 314 couple the reproduced encoded-color signal developed on line 302 to line 314 delayed one horizontal period.

A signal adder 316 has a non-inverting input connected to line 310, another non-inverting input connected to line 314, a control input connected to a line 318 and an output connected to a line 320. Another signal adder 322 has an inverting input connected to line 314, a non-inverting input connected to line 310, a control input connected to line 318 and an output connected to a line 324. The reproduced encoded-color signal, following filtering and equalizing, and a similar delayed signal are combined in phase in adder 316 to develop a similar signal absent the chrominance portion on line 320 and combined out of phase in adder 322 to develop a signal on line 324 containing the chrominance portion thereof. A gating signal developed on line 318 inhibits the adders during the vertical-retrace period.

A tapped-delay circuit 330 connected between line 320 and a line 332 permits the luminance and chrominance portions of the decoder to be equalized. A buffer amplifier 334 couples the signal from line 332 to a line 336.

A balanced mixer 340 has a signal input connected to line 324, a carrier input connected to a line 342 and an output connected to line 344. Driven by a local-oscillator signal developed on line 342, mixer 340 heterodynes the reproduced chrominance signal developed on line 324 back up in frequency to develop a heterodyned chrominance signal on line 344 at the standard chrominance frequency.

A buffer amplifier 346 couples the heterodyned chrominance signal on line 344 to a line 348. A 3.58 megahertz bandpass filter 360 connected between line 348 and a line 362 remove any image components. The heterodyned chrominance signal developed on line 362 is coupled to a line 364 by another buffer amplifier 366.

Another signal adder 370, having an input connected to line 336, another input connected to line 364 and an output connected to cable 36, recombines the components of the reproduced signal to develop the standard reproduced color-television signal on cable 36.

A synchronizing-signal stripper 380, connected between line 302 and a line 382, develops a signal on line 382 representing the synchronizing portion of the reproduced encoded-color signal. The vertical-synchronizing pulses of the signal are eliminated by a 2H eliminator 384 having an input connected to line 382 and outputs connected to a line 368 and a line 388. A vertical-blanking generator 390, having inputs connected to lines 382 and 386 and an output connected by line 318, develops the gating signal on line 318. The local-oscillator signal is generated on line 341 by a phase-locked oscillator 394 connected between lines 382 and 342.

With additional reference to FIG. 3, synchronizing-signal strippers 266 and 380, 2H eliminators 270 and 384, vertical-blanking generators 210 and 390 and phase-locked oscillators 212 and 394 are similar.

Figure 5:
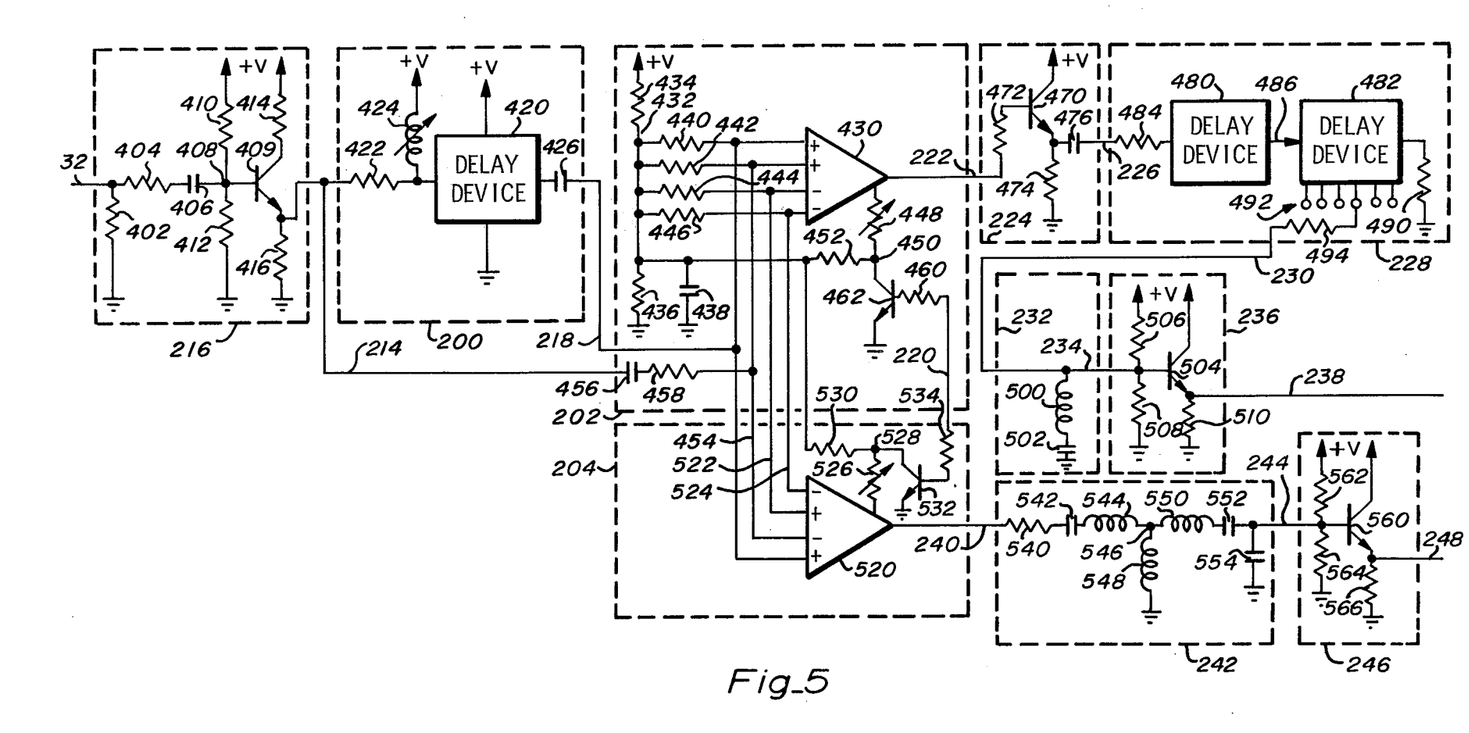
FIG. 5 is a combined block and schematic diagram further illustrating the encoder shown in FIG. 3.

In FIG. 5, buffer amplifier 216, 224, 236 and 246, one-horizontal-period delay circuit 200, signal adders 202 and 204, tapped-delay circuit 228, 3.58 megahertz trap filter 232 and high-pass filter 242 are illustrated in greater detail. Buffer amplifier 216 includes an NPN transistor 400 connected in the common-collector (emitter-follower) configuration for coupling the standard color-television signal developed on cable 32 to line 214. More specifically, cable 32 is terminated by a resistor 402 connected between the cable and circuit ground. The signal developed on the cable is coupled from the cable to the base of the transistor by the series connected of an oscillation-suppressing resistor 404 and a DC-blocking capacitor 406 connected between cable 32 and a node 408 which is connected to the base of the transistor.

The base of transistor 400 is biased by a potential developed by a voltage-divider resistor 410 connected between a positive power-supply potential and node 408 and another voltage-divider resistor 412 connected between node 408 and circuit ground. An oscillation-suppressing resistor 414 couples the collector of the transistor to a positive power-supply potential. The emitter current of the transistor is established by a biasing resistor 416 connected between circuit ground and line 214 which is connected to the emitter of the transistor. As a result, the transistors develop a signal on line 214 similar to the standard color-television signal developed on cable 32.

Delay circuit 200 includes a one-horizontal-period delay device 420 of the type which is commonly employed in 3.58 megahertz comb filters, such as the type which is commonly designated DL55. The input of device 420 is coupled to line 214 by a source-impedance-establishing resistor 422 and to a positive power-supply potential by a phase-setting variable indicator 424. The output of device 420 is coupled to line 218 by a DC-blocking capacitor 426. Delay circuit 200 couples the standard color-television signal developed on line 214 to line 218 delayed one horizontal period.

Adder 202 includes a gate-controlled wide-band operational-amplifier device 430 of the type which is commonly designated 1445. The device has two pairs of differential inputs and a gate-controlled input. The inputs are biased by a reference potential developed on a line 432 by a voltage divider formed by a resistor 434 connected between a positive power-supply potential and line 432 and a resistor 436 connected between line 432 and circuit ground. Decoupling is provided by a filter capacitor 438 connected between line 432 and circuit ground. The differential inputs are each coupled to the reference potential by a respective one of four biasing resistors designated 440, 442, 444 and 446. Resistor 440 also serves as a load resistor for device 420. The gate input is coupled to the reference potential by a pair of resistors including a differential-gain-controlling variable resistor 448, connected between the input and a node 450, and a resistor 452, connected between node 450 and line 432.

The two non-inverting inputs of device 430 are coupled to line 218 and 214, one input being directly connected to line 218 and the other being connected to a line 454 which is coupled to line 214 by the series combination of a DC-blocking capacitor 456 and a voltage-divider resistor 458. The output of device 430 is connectd to line 222. Thus, the standard color-television signal developed on line 214 and the one developed on line 218 delayed one horizontal period are combined in phase by device 430 to develop on line 222 a signal in which the chrominance portion thereof has been removed.

A base-current-limiting resistor 460 couples lines 220 to the base of an NPN transistor 462 having an emitter connected to circuit ground and a collector connected to node 450. Thus, transistor 460 and device 430 respond to the gating signal developed on line 220 to inhibit the generation of the signal developed on line 222 during the vertical-retrace period.

Buffer amplifier 224 includes an NPN transistor 470 connected in the common-collector configuration. The transistor has a base coupled by a current-limiting and oscillation-suppressing resistor 472 to line 222, a collector connected to a positive power-supply potential and an emitter coupled to circuit ground by a biasing resistor 474 and a line 226 by a DC-blocking capacitor 476.

Tapped-delay circuit 228 includes a cascaded pair of 500 nanosecond delay devices 480 and 482. Device 480 has an input coupled by a source-impedance-establishing resistor 484 to line 226 and an output connected to the input of device 482 by a line 486. Device 482 has an output coupled to circuit ground by a load resistor 490 and a plurality of tapped outputs 492. A load resistor 494 couples line 230 to a selected one of outputs 492 chosen to equalize the delay through the luminance and chrominance paths of the encoder.

The series connection of a filter inductor 500 and a filter capacitor 502 between line 230 and circuit ground form 3.58 megahertz trap filter 232. Connected in the common-collector configuration is a transistor 504 includes in buffer amplifier 236. The base of transistor 504, which is connected to line 234, is biased by a voltage divider which includes a resistor 506 connected between a positive power-supply potential and line 234 and another resistor 508 connected between line 234 and circuit ground. The collector of transistor 504 is connected to a positive power-supply potential. Biased by a resistor 510 connected between line 238 and circuit ground, the emitter of transistor 504 is connected to line 238.

Signal adder 204 includes a device 520 similar to device 430 of adder 202. Preferably, device 520 shares biasing components with device 430. One of the non-inverting inputs of device 520 is connected to line 218, and one of the inverting inputs of the device is connected to line 454. For biasing, the other non-inverting and inverting inputs of device 520 are each connected to a respective one of the inverting inputs of device 430 by a line 552 and a line 524, respectively. The gate input of device 520 is also biased by the reference potential developed on line 432, the input being coupled by a differential-gain-controlling variable resistor 526 to a node 528 that is coupled by a resistor 530 to line 432. The device is controlled by a transistor 532 having a grounded emitter, a collector connected to node 528 and a base coupled to line 220 by a current-limiting resistor 534. The output of device 520 is connected to line 240. Since the standard color-television signal developed on line 214 and the one which is developed on line 218 delayed one horizontal period are combined out of phase by device 520, the device develops a signal on line 240 containing only the chrominance portion thereof.

Band-pass filter 242 includes the series connection of a source-impedance-setting resistor 540 and a series-tuned circuit having a capacitor 542 and an inductor 544, the combination being connected between line 240 and a node 546. Further a coupling inductor 548 is connected between node 546 and circuit ground. Also included is another tuned circuit having an inductor 550 and a DC-blocking capacitor 552 series connected between node 546 and line 244 and a capacitor 554 connected between line 244 and circuit ground.

Buffer amplifier 246 includes a transistor 560 connected in the common-collector configuration with a base connected to line 244, a collector connected to a positive power supply potential and an emitter connected to line 248. The base of the transistor is biased by a resistive voltage divider including a resistor 562 connected from a positive power-supply potential to line 244 and another resistor 564 connected from line 244 to circuit ground. A resistor 566, connected from line 248 to circuit ground, establishes the transistor emitter current.

With additional reference to FIG. 4, amplifier 216, delay circuit 200 trap filter 232, and band-pass filter 242 illustrated in FIG. 5 are similar to amplifier 300, delay circuit 330 and band-pass filter 360, respectively. Adders 202 and 204 differ from adders 316 and 322 principally with respect to the impedance of input-biasing resistors 440, 442, 444 and 446.

Figure 6:
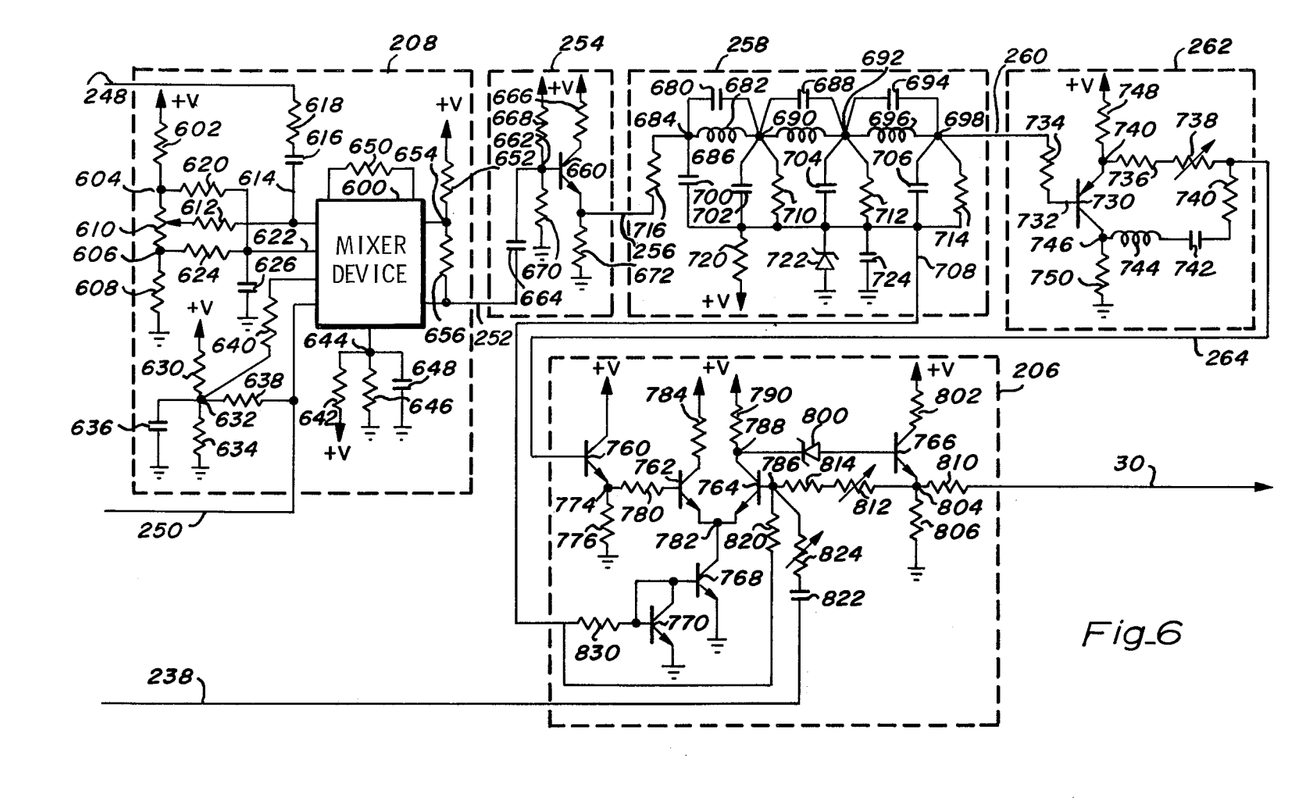
FIG. 6 is a combined block and schematic diagram further illustrating the encoder shown in FIG. 3.

Turning now to FIG. 6, balanced mixer 208, buffer amplifier 254, low-pass filter 258, active equalizer 262 and signal adder 206 are shown in greater detail. Mixer 208 includes a mixer device 600 of the type commonly designated 1496 and three biasing networks. One such network, which additionally provides a means of nulling the carrier, includes a voltage-divider resistor 602 connected between a positive power-supply potential and a node 604 and another voltage-divider resistor 606 connected from a node 608 to circuit ground. The distal ends of a carrier-nulling potentiometer 610 are connected to nodes 604 and 608. The wiper of the potentiometer is connected by a voltage-divider resistor 612 to a line 614 which is connected to the signal input of device 600. Line 614 is coupled by the series connection of a DC-blocking capacitor 616 and a voltage-divider resistor 618 to line 248. A voltage-divider resistor 620, connected from node 604 to a line 622, and another voltage-divider resistor 624, connected from line 622 to node 606, develops a suitable reference potential for biasing a signal-reference input of device 600 which is connected to line 622. Bypassing for the reference potential is accomplished by a decoupling capacitor 626 connected from line 622 to circuit ground.

Another biasing potential is developed by a voltage divider that includes a resistor 630 connected from a positive power-supply potential to a node 632 and another resistor 634 connected from node 632 to circuit ground. A bypass capacitor 636, connected between node 632 and circuit ground, decouples the biasing potential. A decoupling resistor 638 couples the biasing potential from node 632 to the carrier input of device 600 which is connected to line 250. The reference-carrier input of device 600 is coupled to the biasing potential by a resistor 640.

The third biasing network includes a voltage-divider resistor 642 connected between a positive power-supply potential and a node 644 and another voltage-divider resistor 646 connected from node 644 to circuit ground. Node 644, which is connected to another input of device 600, is bypassed by a filter capacitor 648. The gain of device 600 is controlled by a resistor 650 connected between appropriate inputs of the device. A resistor 652 connected between a positive power-supply potential and a node 654 provides bias for one of the outputs of device 600 connected thereto. The other output of the device, which is connected to line 252, is biased by a load resistor 656 connected between line 252 and node 654.

Buffer amplifier 254 includes an NPN transistor 660 connected in the common-collector configuration with a base connected to a node 662 and coupled to line 252 by a DC-blocking capacitor 664, a collector coupled to a positive power-supply potential by a current-limiting and oscillation-suppressing resistor 666 and an emitter connected to line 256. A voltage-divider resistor 668 connected between a positive power-supply potential and node 662 and another voltage-divider resistor 670 connected between node 662 and circuit ground bias the base of the transistor. The transistor emitter current is controlled by a biasing resistor 672 connected between line 256 and circuit ground.

Low-pass filter 258 includes three resonant circuits formed by the parallel combination of a capacitor 680 and an inductor 682 connected between a node 684 and a node 686, the parallel combination of a capacitor 688 and an inductor 690 connected between node 686 and a node 692, and the parallel combination of a capacitor 694 and an inductor 696 connected between node 692 and a node 698 which is connected to line 260. Four coupling capacitors designated 700, 702, 704 and 706 are each connected between a line 708 and a respective one of the nodes 684, 686, 692 and 698. Three Q-setting resistors 710, 712 and 714 are each connected between line 708 and a respective one of the nodes 686, 692 and 698. Finally, node 684 is coupled to line 256 by a source-impedance-setting resistor 716.

A bias potential for active equalizer 262 and signal adder 206 is developed on line 708 by filter 258. A current-limiting resistor 720 is connected from a positive power-supply potential to line 708. The potential is developed by a zener diode 722 connected from line 708 to circuit ground. Filtering is provided by a decoupling capacitor 724 also connected from line 708 to circuit ground.

Equalizer 262 employs a PNP transistor 730 having a base coupled to line 732 by an oscillation-suppressing resistor 734, to be driven by the filtered signal so as to develop a noninverted signal at its emitter and an inverted signal at its collector. The two signals are combined on line 264. The noninverted signal is coupled to line 264 by the series combination of a resistor 736 and a variable resistor 738 connected between line 264 and a node 740 connected to the emitter of the transistor. A peaking circuit including the series combination of a Q-setting resistor 740, a capacitor 742 and an inductor 744 connected between line 264 and a node 746 couples the inverted signal from the collector of the transistor, connected to node 746, to line 264. An emitter-biasing resistor 748 is connected from a positive power-supply potential to node 740. Additionally, a load resistor 750 is connected between node 746 and circuit ground.

Signal adder 206 includes as active components six NPN transistors designated 760, 762, 764, 766, 768 and 770. Transistor 760 is connected in the common-collector configuration with its base connected to line 264, its collector connected to a positive power-supply potential and its emitter connected to a node 774 which is coupled to circuit ground by an emitter-biasing resistor 776. Transistors 762 and 764 are connected in the differential-amplifier configuration. Transistor 762 has a base coupled to node 774 by an oscillator-suppressing resistor 780, an emitter connected to a node 782 and a collector coupled to a positive power-supply potential by a load resistor 784. Transistor 764 has an emitter connected to node 782, a base connected to a node 786 and a collector connected to a node 788 which is coupled to a positive power-supply potential by a load resistor 790.

Transistor 766 is also connected in a common-collector configuration having a base coupled to node 788 by a zener coupling and biasing diode 800, a collector coupled to a positive power-supply potential by an oscillation-suppressing resistor 802 and an emitter connected to a node 804 which is coupled to circuit ground by an emitter-biasing resistor 806. Node 804 is also coupled to cable 30 by a source-impedance-setting resistor 810 and a node 786 by a feedback network including the series combination of a variable gain-controlling resistor 812 and a resistor 814. Also coupled to node 786 by a decoupling resistor 820 is the biasing potential developed on line 708. The signal developed on line 238 is coupled to node 786 by the series combination of a DC-blocking capacitor 822 and a level-controlling variable resistor 824.

The emitter current for transistors 762 and 764 is controlled by transistors 768 and 770. Transistor 768 has a grounded emitter, a collector connected to node 782 and a base connected to both the collector and the base of transistor 770. The base of transistor 770 is also coupled to line 264 by a current-limiting resistor 830, and the emitter of transistor 770 is grounded.

With additional reference to FIG. 4, mixers 208 and 340, low-pass filters 258 and 304 and active equalizers 262 and 308 are similar. Signal adder 370 differs from adder 260 in that an adder similar to adder 202 (in FIG. 5) absent the control transistor, replaces transistor 760 and sums the signals. A fixed biasing resistor connected to circuit ground replaces transistors 768 and 770. Further, a biasing network replaces resistors 820 and 824 and capacitor 822.

Figure 7:
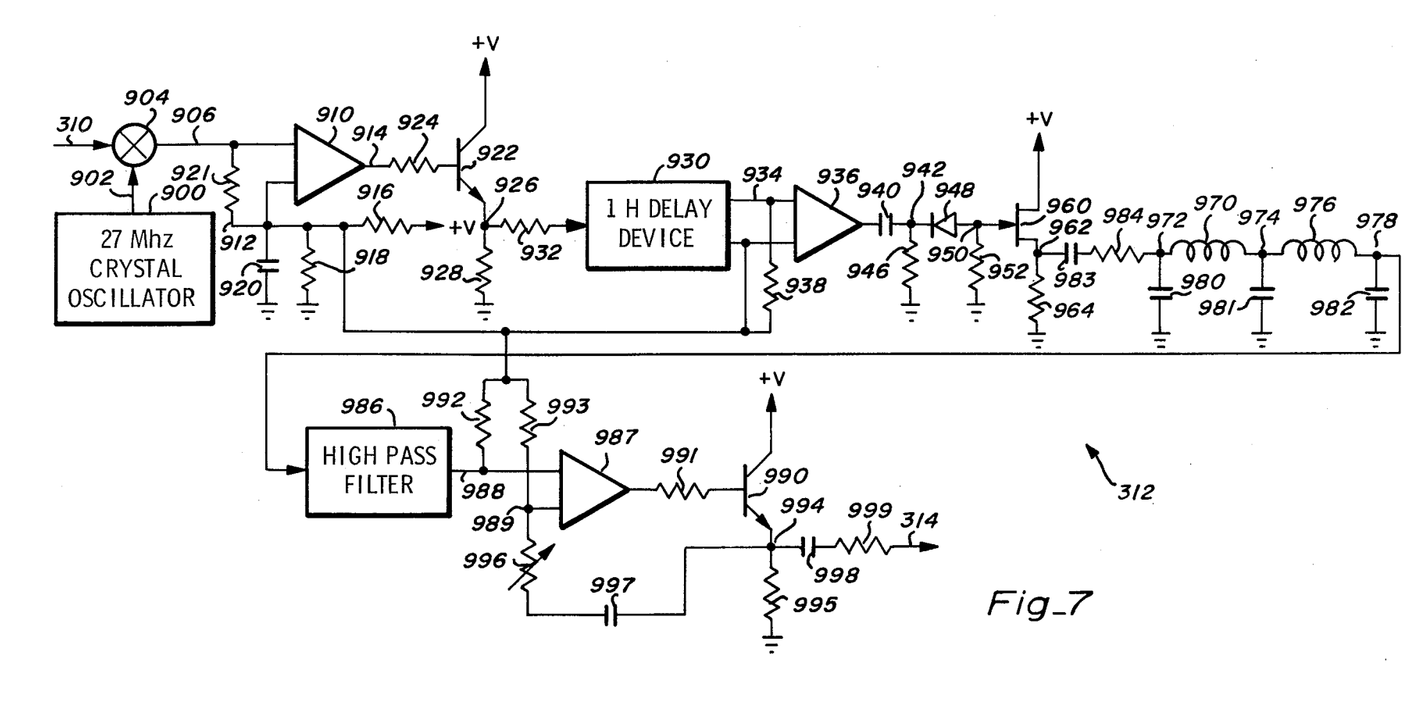
FIG. 7 is a combined block and schematic diagram further illustrating the decoder shown in FIG. 4.

One-horizontal-period-delay circuit 312 (shown in FIG. 4) is further illustrated in FIG. 7. Circuit 312 includes a 27 megahertz crystal oscillator 900 for developing a carrier signal on a line 902. Also included is a balanced mixer 904, similar to mixer 208 (shown in FIG. 6). Mixer 904 which has an input connected to line 310, another input connected to line 902, and an output connected to a line 906, modulates the 27 megahertz carrier signal developed on line 902 with the reproduced encoded-color signal developed on line 310 to develop a 27 megahertz modulated signal on line 906.

An operational amplifier device 910 has a signal input connected to line 906, a reference input connected to a line 912 and an output connected to a line 914. A bias potential for device 910 is developed on line 912 by a voltage-divider resistor 916 connected from a positive power-supply potential to line 912 and another voltage-divider resistor 918 connected from line 912 to circuit ground. The biasing potential is decoupled by a filter capacitor 920 connected between line 912 and circuit ground. The bias potential is coupled to the other input of device 910 by a decoupling resistor 921.

Device 910 drives an NPN transistor 922 connected in the common-collector configuration. Transistor 922 has a base coupled to line 914 by a base-current-limiting and oscillation-suppressing resistor 924, a collector connected to a positive power-supply potential and an emitter connected to a node 926. An emitter-biasing resistor 928 is connected between node 926 and circuit ground.

Transistor 922 drives a 27 megahertz glass-type one-horizontal-period delay device 930 of the type which is designated 5834 by the Andersen Laboratories Corporation. Device 930 has an input coupled to node 926 by a source-impedance-setting resistor 932, an input connected to line 912 and an output connected by a line 934 to a signal input of an operational-amplifier device 936. A load and biasing resistor 938 is connected between line 934 and line 912 which is also connected to a reference input of device 936.

The output of device 936 is coupled by a DC-blocking capacitor 940 to a node 942 to drive an AM detector. The detector includes a current-return resistor 946 connected between node 942 and circuit ground, a detector diode 948 connected between node 942 and a node 950 and a load resistor 952 connected between node 950 and circuit ground.

After the 27 megahertz modulated signal is delayed and detected, it is amplified by a field-effect transistor 960 having a gate connected to node 950, a drain connected to a positive-power supply potential and a source connected to a node 962 that is coupled to circuit ground by a biasing resistor 964.

The detected signal is filtered in a low-pass filter to remove any residual 27 megahertz component and filtered in a high-pass filter to remove any luminance portion which has a frequency that is less than 1 megahertz. The low-pass filter includes an inductor 970 connected between a node 972 and a node 974 and another inductor 976 connected between node 974 and a node 978. Three filter capacitors designated 980, 981 and 982 are each connected between circuit ground and a respective one of the nodes 972, 974 and 978. The series combination of a DC-blocking capacitor 983 and a source-impedance-establishing resistor 984, connected between nodes 962 and 972, couple the detected signal to the filter.

The high-pass filter, designated 986, has an input connected to the output of the low-pass filter on node 978 and an output connected to the signal input of another operational-amplifier device 987 by a line 988. Device 987 also has a reference input connected to a node 989 and an output coupled to the base of a transistor 990 by a current-limiting and oscillation-suppressing resistor 991. Device 987 is biased by a decoupling resistor 992 connected between lines 912 and 988 and another decoupling resistor 993 connected between line 912 and node 989. Preferably, devices 910, 936 and 987 are of the type which are commonly designated 733. Transistor 990 also has a collector connected to a positive power-supply potential and an emitter connected to a node 994 which is coupled to circuit ground by an emitter-biasing resistor 995. Feedback is provided by the series connection of a gain-adjusting variable resistor 996 and a roll-off capacitor 997 connected between nodes 989 and 994. Finally, the delayed signal developed at the emitter of transistor 990 is coupled to line 314 by the series combination of a DC-blocking capacitor 998 and a voltage-divider resistor 999.

It is contemplated that after having read the preceding disclosure, certain alterations and modifications of the present invention will no doubt become apparent to those skilled in the art. It is therefore intended that the following claims be interpreted to cover all such alterations and modifications as fall within the true spirit and scope of the invention.

What is claimed is:

1. An apparatus for developing an encoded-color signal suitable for recordation as a monochrome signal by a video tape recorder from a standard color-television signal, the apparatus comprising in combination:

filter means for separating the standard color-television signal to develop a signal representing the chrominance portion thereof and a signal representing the remainder thereof, said filter means including means for delaying said standard color-television signal one horizontal period thereof to develop a delayed signal, means for combining out of phase said standard color-television signal and said delayed signal to develop said separated chrominance signal and means for combining in phase said standard color-television signal and said delayed signal to develop said remainder signal;

phase-locked-oscillator means for developing a local-oscillator signal having a frequency which is locked to an even multiple of the half-horizontal frequency of said standard color-television signal;

mixer means coupled to said filter means and said phase-locked-oscillator means, said mixer means for combining said separated chrominance signal with said local-oscillator signal to develop a hetrodyned chrominance signal the spectrum of which lies substantially within the monochrome bandwidth of the video tape recorder;

signal-adder means coupled to said filter means and said mixer means, said signal adder means for combining said remainder signal and said hetrodyned chrominance signal to develop the encoded-color signal; and gating-signal-generating means coupled to said filter means, said gating-signal-generating means being responsive to said standard color-television signal and operative to develop a gating signal during the vertical-retrace period thereof, and wherein said out-of-phase-combining means is responsive to said gating signal and operative to inhibit development of said separated chrominance signal during said vertical-retrace period and wherein said in-phase-combining means is responsive to said gating signal and operative to inhibit development of said remainder signal during said verical-retrace period.

2. An apparatus for developing a standard color-television signal having a standard chrominance-carrier frequency from an encoded-color signal characterized by a non-standard encoded-chrominance-carrier frequency which is an odd multiple of the half-horizontal frequency thereof, the multiple being chosen so as to more nearly center the chrominance spectrum within the luminance spectrum thereof, the apparatus comprising in combination:

filter means for separating the encoded-color signal to develop a signal representing the chrominance portion thereof and a signal representing the remainder thereof, said filter means including means for delaying said encoded-color signal one horizontal period thereof to develop a delayed signal, means for combining out of phase said encoded-color signal and said delayed signal to develop said separated-chrominance signal and means for combining in phase said encoded-color signal and said delayed signal to develop said remainder signal;

means phase-locked to said encoded-color signal for developing a local-oscillator signal having a frequency which is an even multiple of the half-horizontal frequency of said encoded-color signal, said oscillator frequency differing the standard chrominance-carrier frequency by the encoded chrominance-carrier frequency;

mixer means coupled to said filter means and said phase-locked-oscillator means, said mixer means for combining said separated-chrominance signal with said local-oscillator signal to develop a hetrodyned chrominance signal having a chrominance-carrier frequency which is the same as said standard chrominance-carrier frequency;

signal-adder means coupled to said filter means and said mixer means, said signal-adder means for combining said remainder signal and said hetrodyned chrominance signal to develop the standard color-television signal; and gating-signal-generating means coupled to said filter means, said gating-signal-generating means being responsive to said encoded-color signal and operative to develop a gating signal during the vertical-retrace period thereof and wherein said out-of-phase combining means is responsive to said gating signal and operative to inhibit development of said separated-chrominance signal during said vertical-retrace period and wherein said in-phase combining means is responsive to said gating signal and operative to inhibit development of said remainder signal during said vertical-retrace period.

3. An apparatus for developing a standard color-television signal having a standard chrominance-carrier frequency from an encoded-color signal characterized by a non-standard encoded-chrominance-carrier frequency which is an odd multiple of the half-horizontal frequency thereof, the multiple being chosen so as to more nearly center the chrominance spectrum within the luminance spectrum thereof, the apparatus comprising in combination:

filter means for separating the encoded-color signal to develop a signal representing the chrominance portion thereof and a signal representing the remainder thereof, said filter means including, means for delaying said encoded-color signal one horizontal period thereof to develop a delayed signal, said delay means having means for generating a carrier signal, means for modulating said carrier signal by said encoded-color signal to develop a carrier-modulated signal, means for delaying said carrier-modulated signal said horizontal period to develop a delayed modulated signal, means for detecting said delayed modulated signal and second filter means for filtering said detected delayed modulated signal to develop said delayed signal, means for combining out of phase said encoded-color signal and said delayed signal to develop said separated-chrominance signal and means for combining in phase said encoded-color signal and said delayed signal to develop said remainder signal;

means phase-locked to said encoded-color signal for developing a local-oscillator signal having a frequency which is an even multiplee of the half-horizontal frequency of said encoded-color signal, said oscillator frequency differing from the standard chrominance-carrier frequency by the encoded chromminance-carrier frequency;

mixer means coupled to said filter means and said phase-locked-oscillator means, said mixer means for combining said separated-chrominance signal with said local-oscillator signal to develop a hetrodyned chrominance signal having a chrominance-carrier frequency which is the same as said standard chrominance-carrier frequency; and signal-adder means coupled to said filter means and said mixer means, said signal-adder means for combining said remainder signal and said hetrodyned chrominance signal to develop the standard color-television signal.

4. An apparatus as recited in claim 3 wherein said second filter means includes high-pass filter means having a cutoff frequency below the spectrum of said chrominance portion.

5. An apparatus as recited in claim 3 further comprising gating-signal-generating means coupled to said filter means, said gating-signal-generating means being responsive to said encoded-color signal and operative to develop a gating signal during the vertical-retrace period thereof and wherein said out-of-phase combining means is responsive to said gating signal and operative to inhibit development of said separated-chrominance signal during said vertical-retrace period and wherein said in-phase combining means is responsive to said gating signal and operative to inhibit development of said remainder signal during said vertical-retrace period.

6. An apparatus as recited in claim 5 wherein said second filter means includes a high-pass filter having a cutoff frequency below the spectrum of said chrominance portion.

7. An apparatus as recited in claim 3 wherein said carrier signal has a frequency which exceeds 20 MHz.

* * * * *